United States Patent [19]

Schaper et al.

[11] Patent Number: 5,582,417
[45] Date of Patent: Dec. 10, 1996

[54] INTEGRATED SKATE

[75] Inventors: Richard Schaper, Maple Grove; Dan M. Sutherland, Arden Hills, both of Minn.

[73] Assignee: First Team Sports, Inc., Anoka, Minn.

[21] Appl. No.: 139,203

[22] Filed: Oct. 19, 1993

[51] Int. Cl.⁶ .................................................. A63C 17/02
[52] U.S. Cl. .................... 280/11.22; 280/11.27; 425/555
[58] Field of Search ................. 280/11.19, 11.2, 280/11.22, 11.23, 11.27, 11.28; 425/542, 555

[56] References Cited

U.S. PATENT DOCUMENTS

| | | | |
|---|---|---|---|
| D. 301,908 | 6/1989 | Olson et al. | D21/226 |
| D. 321,393 | 11/1991 | Olson et al. | D21/226 |
| D. 327,565 | 7/1992 | Graham | D2/275 |
| D. 334,225 | 3/1993 | Graham | D21/226 |
| 3,798,804 | 3/1974 | Funck | 36/72 R |
| 3,939,583 | 2/1976 | Deumann | 36/2.5 R |
| 4,132,016 | 1/1979 | Vaccari | 36/114 |
| 4,295,655 | 10/1981 | Landay et al. | 280/11.28 |
| 4,618,158 | 10/1986 | Liberkowski | 280/11.1 BR |
| 4,909,523 | 3/1990 | Olson | 280/11.2 |
| 5,092,614 | 3/1992 | Malewicz | 280/11.22 |
| 5,326,115 | 7/1994 | Seltzer | 280/11.27 |

OTHER PUBLICATIONS

Photograph (attached Exhibit 1) of an Ultra–Wheels® Zephyr Model Skate. The Zephyr skate was present at a show in Chicago, Ill. in Aug., 1992.

Primary Examiner—Richard M. Camby
Attorney, Agent, or Firm—Kinney & Lange, P.A.

[57] ABSTRACT

The present invention includes an in-line roller skate substantially free of the effects of differential shrinkage and a method of molding an in-line skate substantially free of the effects of differential shrinkage, the skate including a molded boot with a sole; a molded wheel frame integral with the sole; a plurality of in-line wheels rotatably attached to the wheel frame; and a mechanism for minimizing the effects of differential shrinkage.

22 Claims, 8 Drawing Sheets

INTEGRATED SKATE

BACKGROUND OF THE INVENTION

The present invention, generally relates to roller skates. More specifically, the present invention relates to in-line roller skates, to molds for making in-line skates and to a method of molding in-line skates. The present invention also relates to a molded boot with a mechanism for securing laces.

In-line roller skates generally include a boot, a frame attached to the boot, and in-line wheels rotatably attached to the frame. The boot often includes a shell section and a cuff section which is pivotally connected to the shell section. Some in-line skates include braking mechanisms which are typically attached to the frame.

The boot and frame are traditionally manufactured as separate pieces such that the frame is attached to the sole of the boot after manufacture of the frame and boot. The frame is commonly attached to the boot with rivets, though other fastening mechanisms are also used.

Separate manufacture of the boot and frame with later attachment of the frame to the boot presents challenging design, manufacture, and quality control problems. One set of problems arises where the rivets or other fasteners protrude inside the boot. The protruding rivets or fasteners often require added padding to shield skaters' feet from injury or discomfort.

Another set of problems concerns proper positioning of the frame relative to the boot. Proper alignment of the frame and the boot is necessary to insure optimum skate performance and comfort. The possibility for misalignment of the frame and boot is inherent in the acts of positioning the frame relative to the boot and fixing the frame to the boot. Also, longterm, secure attachment of the boot and the frame is critical. Otherwise skate performance may suffer and the skater may risk physical injury. Skates with boots and frames which are not firmly attached or are out of alignment are of little value to a skater.

It is desirable to avoid the listed problems related to separate boot and frame manufacture and assembly. Potential techniques for avoiding the problems include combined manufacture of the boot and frame as a single piece unit. One form of combined manufacture includes integrated molding of the boot and frame. The ULTRA-WHEELS® Zephyr model skate, manufactured by Koflach Sportgerate Gesellschaft of Graz, Austria, is an example of an in-line skate with an integrally molded boot and frame. Integrated molding may avoid fastener protrusion inside the boot, assembly alignment problems, and difficulties in attaining secure attachment.

Though it is desirable to mold the boot and frame as an integral unit, integrated molding may include a variety of problems. For example, integrated molding of the frame and boot typically creates differential shrinkage problems such as sink marks, warping, and molded-in stress. N. G. McCrum, C. P. Buckley & C. B. Bucknail, Principles of Polymer Engineering 337 (1988). Beyond aesthetic concerns, differential shrinkage may weaken the integrally molded skate, may cause misalignment of the skate frame walls, or may prevent all of the skate wheels from simultaneously contacting a level ground surface. Additionally, development of sink marks in the sole of the boot during manufacture may cause the skater discomfort while wearing the skate. Poor or undependable skate performance may also result from differential shrinkage.

Skates with integrally molded frames and boots discourage resort to some potential techniques for minimizing the effects of differential shrinkage. For example, it is undesirable to decrease the thickness of portions of the sole using mold core pins. Added core pins require addition of padding in the sole for skater comfort and may increase the difficulty of removing the integrally molded boot and frame from the mold core. Also, strengthening the frame by including honeycomb reinforcement along interior sides of the frame walls is problematic. Such honeycomb reinforcement creates substantial mold design problems and may increase the difficulty of removing the integrally molded boot and frame from the mold core. Another potential solution, increasing the size of the fillets at the junction of the frame walls with the boot sole, may enhance rather than minimize the effects of differential shrinkage. Additionally, larger fillets may increase the weight of the boot and, considering other desirable features, may complicate skate design and molding.

Though in-line skates with integrally molded boot and frame are desirable, integral molding of the frame and boot is a potential source of design manufacture, comfort, performance, and aesthetic problems. Integral molding of in-line skates includes issues of differential shrinkage and issues of limitations upon techniques for avoiding or minimizing undesirable effects of differential shrinkage.

Another point of concern of in-line skates in particular and footwear in general involves eyelets. In footwear, eyelets are commonly used to line the lace holes. Eyelet use is sometimes beneficial, such as when eyelets line lace holes of footwear made of soft material. In this application, the eyelets help prevent the laces from tearing the soft material. However, eyelets are not always beneficial. For example, the knurled portion of eyelets may have sharp edges which aggravate lace wear. These sharp edges often contribute to premature lace breakage.

Eyelets may also cause problems when used with hardened shells of footwear made of certain molding resins. Hardened shells are not generally conducive to secure eyelet attachment. Even minimal variations in the wall thickness of hardened shells may cause uneven eyelet attachment and consequent failure of eyelets. Eyelets which cannot be effectively attached to a molded in-line skate are of diminished value to the manufacturer and the skater. One solution to the eyelet attachment problem is to use softer materials which will better accept eyelets. This solution is unsatisfactory to those who want or require the features of hardened shells of particular molding resins.

Molding resins which cure into hardened finished materials are frequently desired molding components for in-line skates. Harder materials are typically more durable and often last longer than softer materials under certain conditions. Additionally, harder materials may enhance safety in properly designed skates. Skates made of harder materials may shield the skater from contact with objects and obstructions and may decrease risk of injury in the event of collision.

Another point of concern of in-line skates involves pivoting movement of cuffs about boots. Cuffs are sometimes pivotally attached to boots of in-line skates to provide lateral ankle support. Boots with pivoting cuffs may include movement-related problems, particularly where the cuffs and boots are made of harder materials. For example, depending upon the design of the boot, the cuff may hang up on the rear portion of the boot as the cuff pivots rearward. Collapse or other failure of the boot may also occur when the cuff pivots relative to the boot. Safety and performance considerations make cuff hang up and boot failure undesirable features for in-line skates.

SUMMARY OF THE INVENTION

The present invention includes an in-line roller skate which is substantially free of the effects of differential shrinkage, with the skate including a molded boot with a sole; a molded wheel frame integral with the sole; a plurality of in-line wheels rotatably attached to the wheel frame; and a mechanism for minimizing the effects of differential shrinkage. The present invention also includes a mold for making an in-line skate that is substantially free of the effects of differential shrinkage and further includes a method of molding an in-line roller skate that is substantially free of the effects of differential shrinkage.

DETAILED DESCRIPTION OF THE PREFERRED EMBODIMENTS

Figure 1:
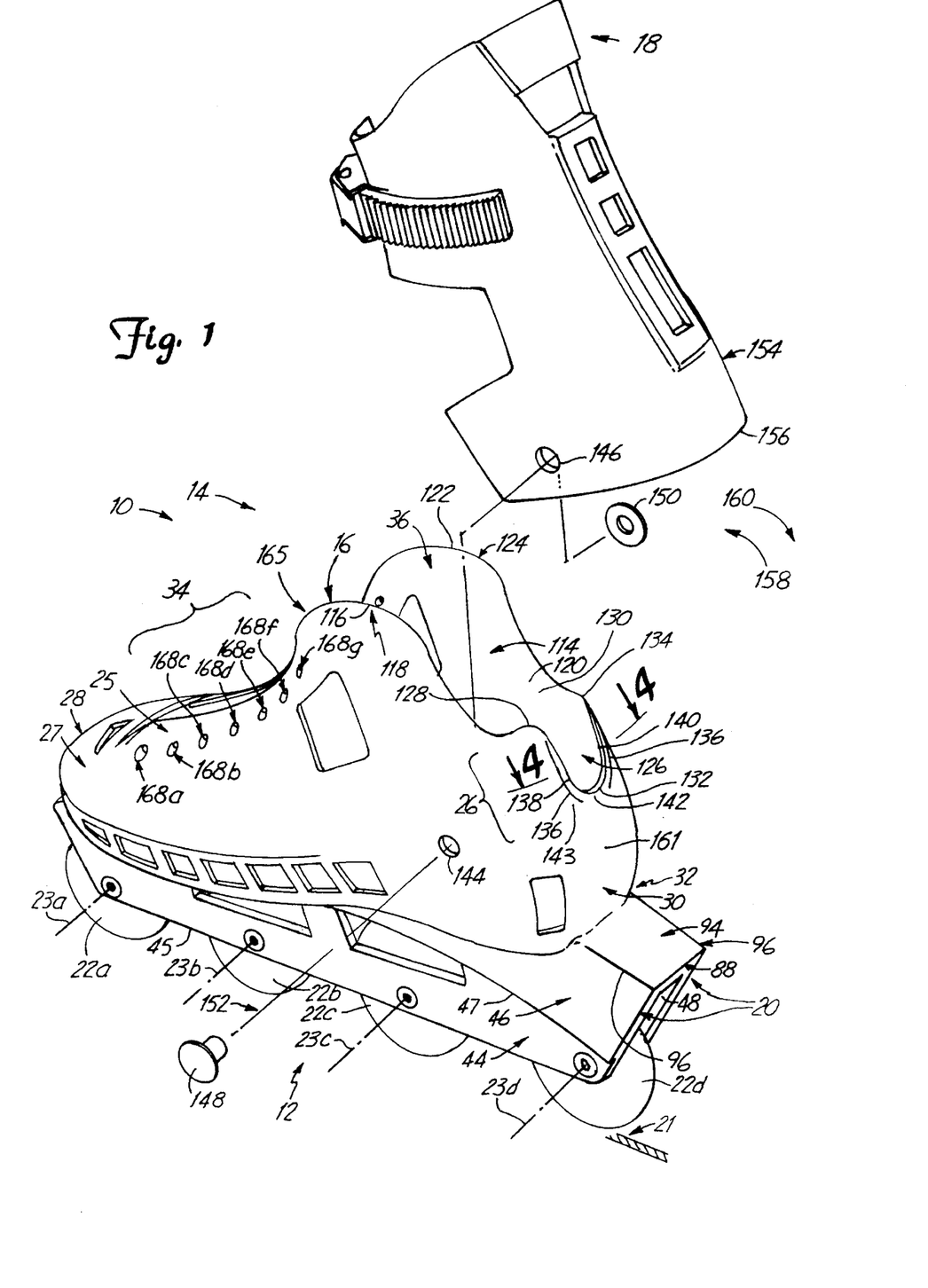
FIG. 1 is a perspective view of one embodiment of the improved in-line skate of the present invention.

An in-line roller skate of the present invention is indicated generally at 10 in FIG. 1. The roller skate 10 includes a molded wheel frame 12 and a molded boot 14. The frame 12 and the boot 14 are integrally connected. The boot 14 includes a molded shell 16, a molded cuff 18 which is pivotally connected to the shell 16, and a liner (not shown) of conventional design. The wheel frame 12 includes a pair of frame walls 20 which extend downward from the shell 16 toward a ground surface 21. The skate 10 also includes front, front center, rear center and rear wheels 22a, 22b, 22c, 22d rotatably mounted in tandem fashion in a conventional manner between the walls 20. The wheels 22a–22d turn, respectively, about axes 23a–23d of rotation. The wheels 22a–22d are preferably constructed of urethane or a similar material.

Figures 3, 3A, 4:
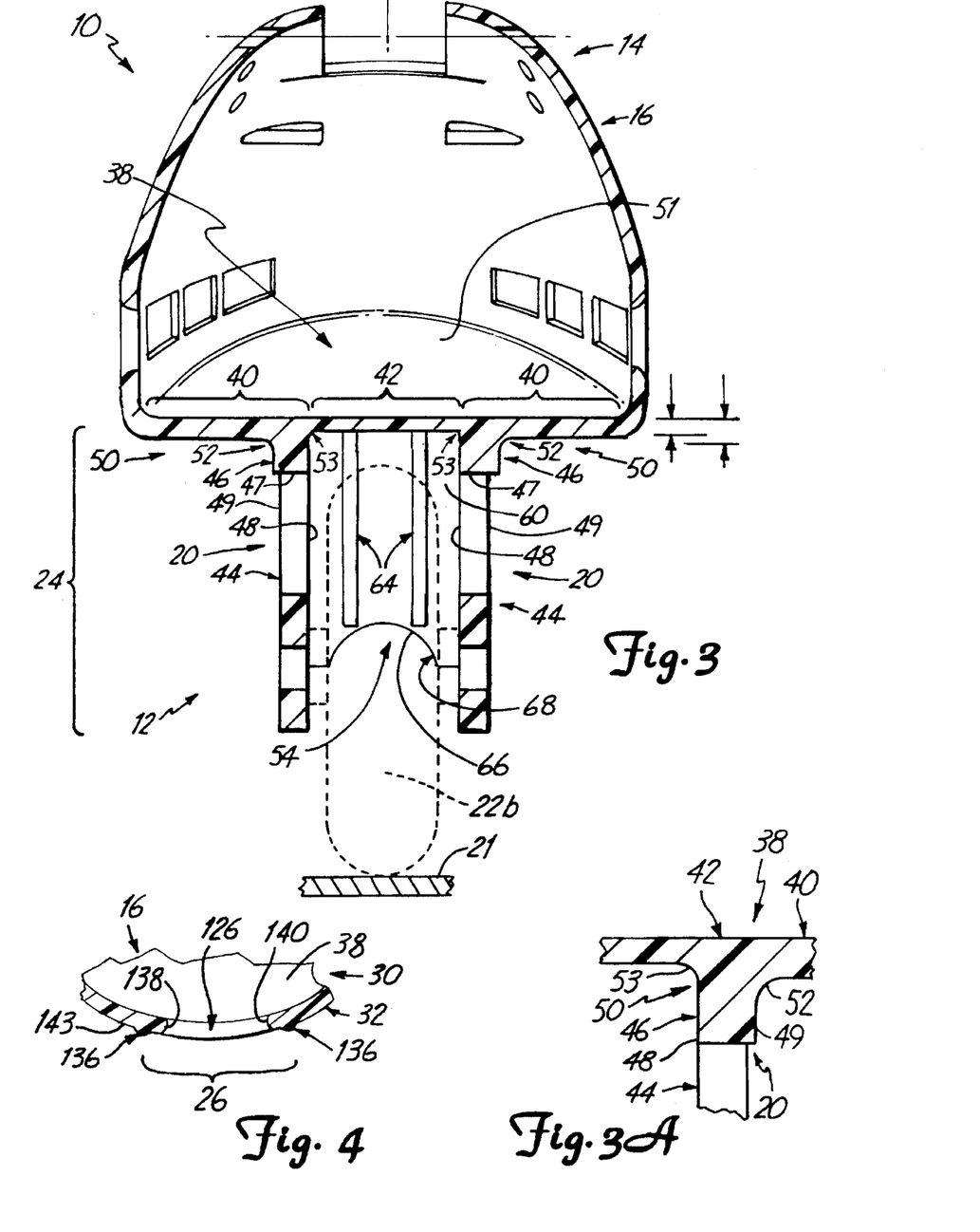
FIG. 3 is a sectional view taken along line 3—3 of FIG. 2.
FIG. 3a is an enlarged fragmentary view taken from FIG. 3 of a frame wall and the sole of the improved in-line skate of the present invention.
FIG. 4 is a sectional view taken along line 4—4 of FIG. 1.

The skate 10, referring to FIG. 3, also includes features 24 for minimizing the effects of differential shrinkage. Referring back to FIG. 1, the skate 10 also includes a mechanism 25 for securing tightened laces and a mechanism 26 for strengthening the boot 14 proximate the cuff 18. The present invention additionally includes a method of molding the in-line roller skate 10 such that the skate 10 is substantially free of the effects of differential shrinkage.

Throughout the drawings, like elements will be referred to using like reference characters.

The shell 16 includes a toe section 27 at a front end 28 of the shell 16 and a heel section 30 at a rear end 32 of the shell 16. The shell 16 also includes a fastening portion 34 and a foot insertion aperture 36. The fastening portion 34 extends from proximate the toe section 27 rearward about 65% of the length of the boot 14 toward the heel section 30. The foot insertion aperture 36 extends between the rear end 32 and the fastening portion 34 of the shell 16.

Figure 2:
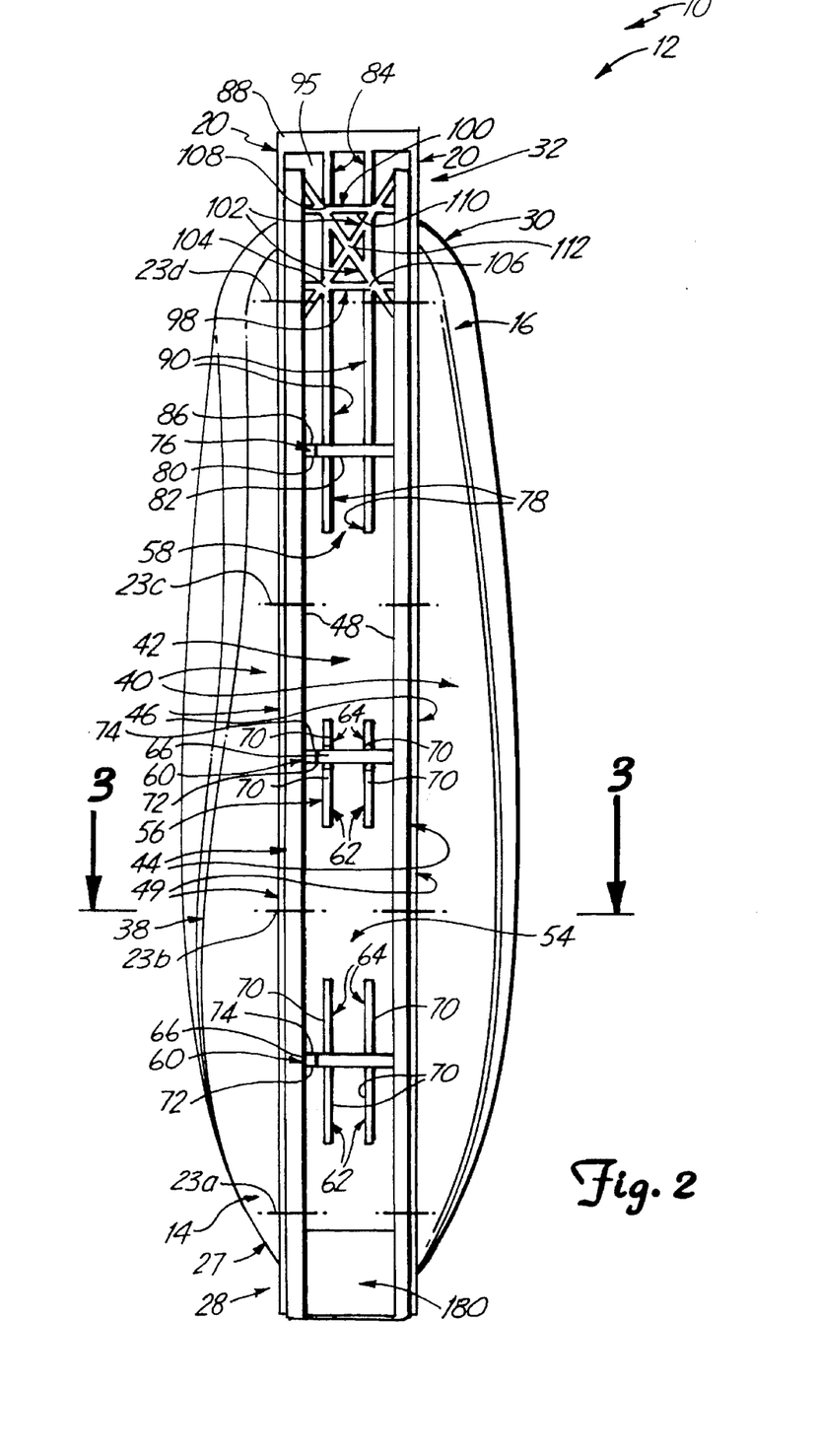
FIG. 2 is a bottom plan view of one embodiment of the improved in-line skate of the present invention with the wheels of the skate not shown for purposes of clarity.

As best illustrated in FIG. 3, the shell 16 includes a sole 38. The sole 38 is integrally connected with each of the frame walls 20. The sole 38 further includes a pair of outer sole portions 40 and a middle sole portion 42. Referring back to FIG. 2, the outer and middle sole portions 40, 42 extend along substantially the entire length of the sole 38. Referring back to FIG. 1, the frame walls 20 each include both a lower frame wall portion 44 and an upper frame wall portion 46. As best illustrated in FIG. 2, the lower and upper frame wall portions 44, 46 are substantially in alignment along an inside surface 48 of each frame wall 20. Referring to FIG. 3, the lower and upper frame wall portions 44, 46 are integral with each other at a lower edge 47 of the upper frame wall portion 46. Each frame wall 20 is integral with and oriented substantially perpendicular with respect to the sole 38 along substantially the entire length of the sole 38. In one embodiment, the frame walls 20 are located about 1.15 inches apart.

Figure 8:
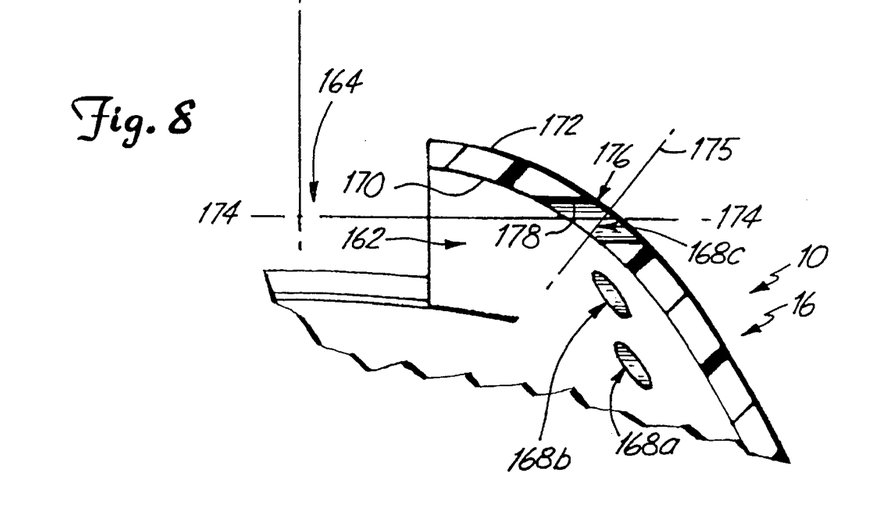
FIG. 8 is a partial sectional view taken along line 8—8 of FIG. 7.

As partly visible in FIG. 8, the lower edge 47 of the upper frame wall portion 46 is substantially horizontally oriented from the front end 28 of the shell 16 midway toward the rear end 32 of the shell 16. Thereafter, referring back to FIG. 1, the lower edge 47 gradually slopes downward toward the ground surface 21 as the lower edge 47 approaches and passes beneath the rear end 32 of the shell 16. The distance between the sole 38 and the edge 47 varies from about 0.625 inches at the front end 28 of the shell 32 to about 0.25 inches midway toward the rear end 32 of the shell 16 to about 2 inches at the rear end 32 of the shell 16. The variations in distance between the sole 38 and the edge 47 reflect the contour of the sole 38, which is shaped to fit skaters' feet, and the orientation of the edge 47. A lower edge 45 of the lower frame wall portion 44 is substantially straight and oriented horizontally with respect to the ground surface 21. The distance between the lower edges 45 and 47 varies from about 1.5 inches at the front end 28 of the shell 32 to about 1.875 inches midway toward the rear end 32 of the shell 16 to about 0.875 inches proximate the rear end 32 of the shell 16.

The first feature 24 for minimizing the effects of differential shrinkage, referring to FIG. 3, concerns a mechanism 50 for integrating the sole 38 and the frame walls 20. The mechanism 50 for integrating the sole 38 and the frame walls 20 includes different thicknesses for the middle sole portion 42 versus the outer sole portions 40. The middle sole portion 42 is between seventy-five percent (75%) and eighty-five percent (85%) as thick as the outer sole portions 40. In one embodiment, the middle sole portion 42 is preferably about 0.200 inches thick and the outer sole portions 40 are about 0.250 inches thick. An inside surface 51 of the sole 38 is substantially smooth and unaffected by the change in thickness between the middle sole portion 42 and the outer sole portions 40.

The mechanism 50 for integrating the sole 38 and the frame walls 20 also includes integral connection of the frame walls 20 and the sole 38. Specifically, the frame walls 20 are integrally connected to the outer sole portions 40 such that the middle sole portion 42 is located between the outer sole portions 40. Also, the middle sole portion 42 extends from the inside surface 48 of one of the pair of frame walls 20 to the inside surface 48 of the other of the pair of frame walls 20.

Referring to FIG. 3a, the mechanism 50 for integrating the sole 38 and the frame walls 20 additionally includes an outer pair of fillets 52 and an inner pair of fillets 53 which help minimize the effects of differential shrinkage. The fillets 52 are located where outside surfaces 49 of the frame walls 20 meet the sole 38. The fillets 52 extend along substantially the entire length of the sole 38. The fillets 53 are located where the inside surfaces 48 of the frame walls 20 meet the sole 38, except at points where other structures such as reinforcement ribbing exist. The fillets 53 are also included at other points along the inside surfaces 48 of the frame walls 20 as later described. The radius of the fillets 52 is approximately 0.25 inches and the radius of the fillets 53 is approximately 0.030 inches.

Referring back to FIG. 3, the mechanism 50 for integrating the sole 38 and the frame walls 20 further includes differing relative thicknesses between the lower frame wall portions 44, the upper frame wall portions 46, and the outer sole portions 40. For example, the thickness of the lower frame wall portion 44 is approximately eighty percent (80%) of the thickness of the upper frame wall portion 46. The thickness of the upper frame wall portions 46 is approximately seventy-five percent (75%) of the thickness of the outer sole portions 40. The lower frame wall portion 44 is approximately 0.16 inches thick, the upper frame wall portion 46 is approximately 0.19 inches thick, and the outer sole portions 40 are approximately 0.250 inches thick.

The second feature 24 for minimizing the effects of differential shrinkage includes front, middle, and rear reinforcement ribbing sections 54, 56, and 58 as illustrated in FIG. 2. The front reinforcement ribbing section 54 is located between the axis 23a of rotation and the axis 23b of rotation, and the middle reinforcement ribbing section 56 is located between the axis 23b of rotation and the axis 23c of rotation. The rear reinforcement ribbing section 58 is located both between the axis 23c of rotation and the axis 23d of rotation and above the axis 23d of rotation.

The front and middle reinforcement ribbing sections 54, 56 each include a cross member 60, a pair of forwardly extending brace ribs 62, and a pair of rearwardly extending brace ribs 64. The cross members 60 are integral with and are oriented substantially perpendicularly with respect to the middle sole portion 42 and the inside surfaces 48 of the frame walls 20. The cross members 60 are generally rectangular in shape, but include curved openings 66 at a lower end 68, as best illustrated in FIG. 3. The curved openings 66 are substantially semi-circular in shape and are concave toward the ground surface 21.

Referring back to FIG. 2, the forwardly and the rearwardly extending brace ribs 62, 64 are each shaped approximately like a right triangle (not shown). The two sides (not shown) forming the right angle (not shown) of the approximate right triangle are integral with the sole 38 and the cross members 60, respectively. The side 70 opposite the right angle (not shown) of each brace rib 62, 64 is curved slightly inward toward the cross member 60 to accommodate different wheel 22a–22d diameters. Each side 70 substantially extends from the respective cross member 60 to the middle sole portion 42.

The brace ribs 62 are integral with and are oriented substantially perpendicularly with respect to the middle sole portion 42 and front sides 72 of the cross members 60 and extend toward the front end 28 of the shell 16. The rearwardly extending brace ribs 64 are integral with the middle sole portion 42, and rear sides 74 of the cross members 60 and extend rearward from the cross members 60 toward the rear end 32 of the shell 16. The forwardly extending brace ribs 62 are in substantial alignment with the rearwardly extending brace ribs 64, respectively. The ribs 62, 64 and the cross members 60 are approximately of equal thickness. In one embodiment, the brace ribs 62, 64 and the cross members 60 are approximately 0.094 inches thick.

The rear reinforcement ribbing section 58 includes a cross member 76 which is substantially similar to the cross members 60. The cross member 76 is integral with and is oriented substantially perpendicularly with respect to the middle sole portion 42 and the inside surfaces 48 of the frame walls 20. The rear reinforcement ribbing section 58 also includes a pair of forwardly extending brace ribs 78 which are substantially similar to the forwardly extending brace ribs 62. The brace ribs 78 are integral with the middle sole portion 42 and with a front side 80 of the cross member 76 and extend forward from the cross member 76 toward the front 28 of the shell 16. The thickness of the brace ribs 78 gradually decreases from approximately 0.125 inches proximate the sole 38 to approximately 0.095 inches at a lower edge 82 of the ribs 78.

The rear reinforcement ribbing section 58 also includes a pair of rearwardly extending brace ribs 84. The ribs 84 are integral with the middle sole portion 42 and a rear side 86 of the cross member 76, are oriented substantially perpendicularly with respect to the cross member 76, and extend from the cross member 76 to a rear end 88 of the frame 12. The rearwardly extending brace ribs 84 resemble the rearwardly extending brace ribs 64. However, the ribs 84, unlike the ribs 64, do not include the sides 70 which substantially extend to the middle sole portion 42. Instead, the ribs 84 include long sides 90 approaching, but not extending to, the middle sole portion 42. The long sides 90 approach to within approximately 0.56 inches of the middle sole portion 42 approximately 1.25 inches behind the cross member 76. The long sides 90 thereafter extend rearward toward the rear end 88 of the frame 12, leaving sufficient clearance for the rear wheel 22d. The rearwardly extending brace ribs 84 gradually vary in thickness from approximately 0.125 inches proximate the middle sole portion 42 to approximately 0.095 inches as the long sides 90 of the ribs 84 approach the cross member 76. The ribs 84 are substantially in alignment with the ribs 62, 64, 78, respectively.

The frame walls 20 extend behind the rear end 32 of the shell 16, as best illustrated in FIG. 1. In one embodiment, the frame walls 20 preferably extend approximately 1 inch behind the rear end 32. The frame 12 includes a cover plate 94 which is integral with the rear end 32 of the shell 16 proximate the sole 38 and which integrally connects upper edges 96 of the frame walls 20. The fillets 53 (not shown in FIG. 1) are included where the inside surfaces 48 of the frame walls 20 and the cover plate 94 meet, except at points where other structures such as reinforcement ribbing exist.

The cover plate 94 extends rearward from the rear end 32 of the shell 16 to the rear end 88 of the frame 12. As best illustrated in FIG. 2, the rearwardly extending brace ribs 84 are integral with a bottom side 95 of the cover plate 94. The long side 90 approaches to within about 0.35 inches of the bottom side 95. Referring back to FIG. 1, the cover plate 94 slopes downward toward the ground surface 21 at an angle of approximately twenty degrees (20°) with respect to the ground surface 21.

As best illustrated in FIG. 2, the frame 12, proximate the axis 23d of rotation and the middle sole portion 42 and substantially centered below the rear end 32 of the shell 16, includes a front cross rib 98, a rear cross rib 100, and a pair of crisscrossing ribs 102. The front and rear cross ribs 98, 100, the crisscrossing ribs 102, and the rearwardly extending brace ribs 84 are each integral with and oriented substantially perpendicular to the middle sole portion 42. Additionally, the front cross rib 98, the rearwardly extending brace ribs 84 and the crisscrossing ribs 102 are integrally connected to each other at points 104 and 106. The rear cross rib 100, the rearwardly extending brace ribs 84 and the crisscrossing ribs 102 are integrally connected to each other at points 108 and 110. Also, the crisscrossing ribs 102 cross and are integral with each other at a point 112 substantially centered between the front and rear cross ribs 98, 100 and between the rearwardly extending brace ribs 84. The front and rear cross ribs 98, 100, the crisscrossing ribs 102, and the rearwardly extending brace ribs 84, proximate the rear end 32 of the shell 16, extend a substantially equivalent distance beneath the middle sole portion 42.

Referring back to FIG. 1, the shell 16 includes an upper curved opening 114 which extends rearward and downward from a point 116 located approximately midway along a left side 118 of the foot insertion aperture 36 toward a central point 120 proximate the rear end 32 of the shell 16. The upper curved opening 114 continues from the point 120 proximate the rear end 32 forward and upward toward a point 122 located approximately midway along a right side 124 of the foot insertion aperture 36. The upper curved opening 114, between the point 116 and the point 120 is substantially a mirror image of the upper curved opening 114 between the point 122 and the point 120. The point 120 is centrally located proximate the rear end 32 of the shell 16 approximately 4 inches above the middle sole portion 42.

The shell 16 also includes a lower curved opening 126 which is substantially U-shaped. The lower curved opening 126 extends from a left point 128 at a bottom 130 of the upper curved opening 114 downward, rearward and inward to a point 132 at the rear end 32 of the shell 16. The lower curved opening 126 continues from the point 132 at the rear end 32 outward, upward and forward toward a right point 134 at the bottom 130 of the upper curved opening 114. The lower curved opening 126, between the left point 128 and the point 132 is substantially a mirror image of the lower curved opening 126 between the right point 134 and the point 132. The point 132 is centrally located at the rear end 32 of the shell 16 approximately 2.5 inches above the middle sole portion 42.

The mechanism 26 for strengthening the boot 14 proximate the cuff 18, includes a pair of longitudinal ridges 136 as in FIG. 4, located adjacent a left and right side 138, 140 respectively of the lower curve opening 126. In one embodiment, the ridges 136 predominantly are located approximately 0.15 inches outside of the lower curved opening 126. The ridges 136 are located more distant from the opening 126, referring back to FIG. 1, at a bottom end 142 of the opening 126. Though the ridges 136 follow the contour of the shell 16, the ridges generally follow a straight path. The ridges are approximately 0.15 inches wide and extend about 0.054 inches above an outside surface 143 of the shell 16.

The shell 16 and the cuff 18 each include a pair of cooperating and aligned apertures 144, 146 respectively (only one aperture of each pair of apertures 144, 146 is visible) such that a skater's lower leg (not shown) may pivot toward and away from the toe section 27 of the shell 16 during the skating movement. One rivet of a pair of rivets 148 (only rivet of the pair of rivets 148 is visible) is inserted through one of the apertures 144 and one of the apertures 146. The rivet is crimped onto one of a pair of washers 150 to pivotally attach the cuff 18 to the shell 16. The skate 10 further includes an axis of rotation 152 which extends through the center of the apertures 144, 146, the rivets 148, and the washers 150. The cuff 18 selectively pivots about the axis of rotation 152 toward and away from the toe section 26 in the direction of arrows 158, 160.

A lower portion 154 of the cuff 18 moves over the lower curved opening 126 as the cuff 18 pivots rearward about the axis 152. An inside surface (not shown) of the cuff 18 proximate the lower portion of the cuff 18 slidably engages the ridges 136 such that the lower portion 154 of the cuff 18 glides over the heal section 30 of the shell 16, including the lower curved opening 126.

Additionally, the cuff 18 and the shell 16 are sufficiently thick and are molded using resins sufficient to prevent wrinkling or buckling of either the cuff 18 or the shell 16 as the cuff 18 glides over the ridges 136. In one embodiment, the shell 16 and cuff 18 are made of a molding resin, such as Himont TPO-45A-C modified polypropylene synthetic resin alloy. Himont TPO-45A-C resin alloy is available from Himont Advanced Materials Company of Lansing, Mich. In one embodiment, the lower portion 154 of the cuff 18 is approximately 0.120 inches thick and the shell 16, proximate the ridges 136, is approximately 0.20 inches thick.

Contact between the upper curved opening 114, proximate the foot insertion aperture 36, and the inside surface (not shown) of the cuff 18 prevents a bottom edge 156 of the cuff 18 from advancing significantly above the bottom edge 130 of the upper curved opening 114 when the cuff 18 pivots forward in the direction indicated by arrow 158. When the shell 18 pivots rearward in the direction indicated by arrow 160, the cuff 18 preferably does not move significantly beyond a position of substantial vertical alignment with the foot insertion aperture 36. In one embodiment, the cuff is limited from moving beyond substantial vertical alignment with the foot insertion aperture 36 by contact between the inside surface (not shown) of the cuff 18 and an outside lower surface 161 of the rear end 30 and with the ridges 136.

Figure 5:
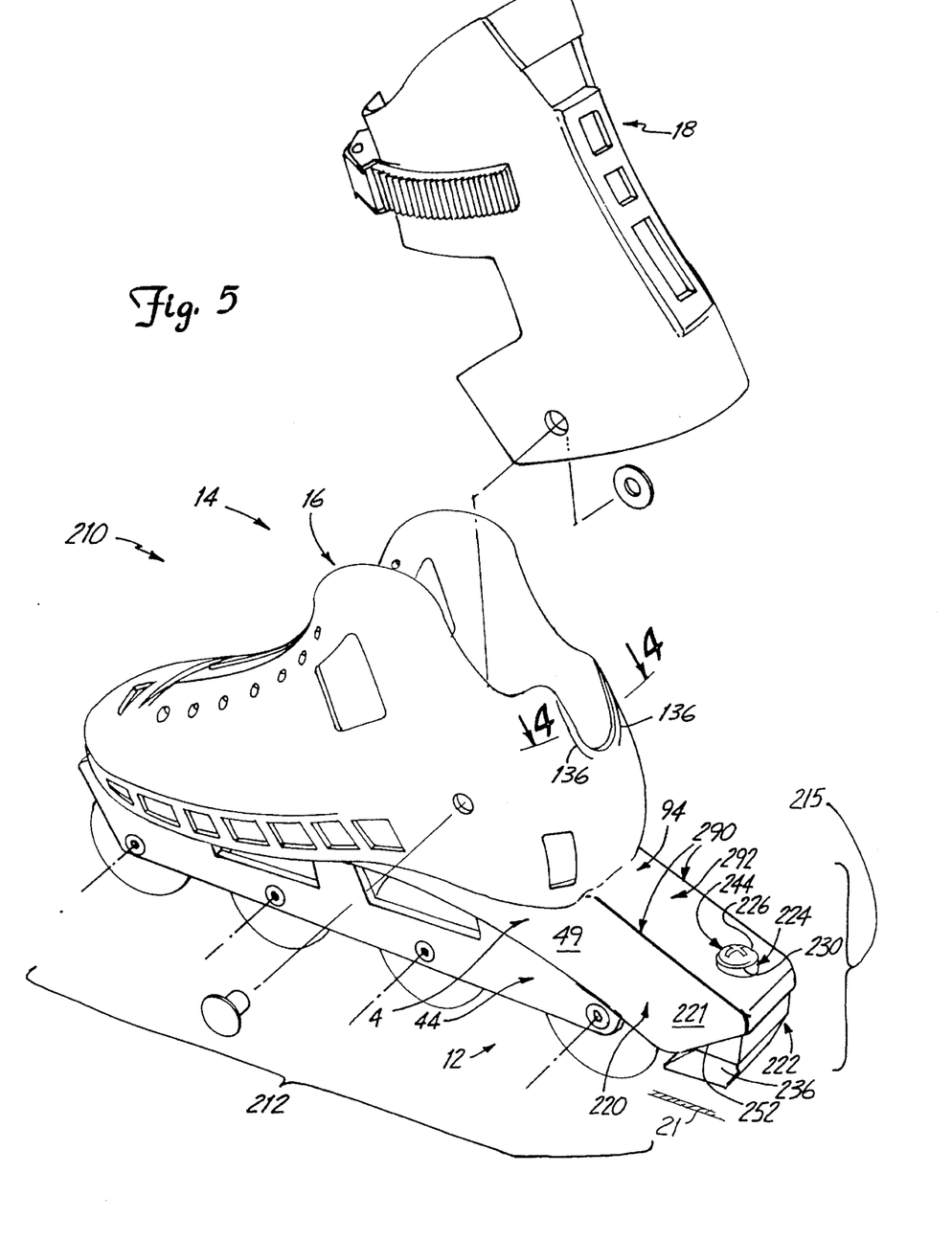
FIG. 5 is a perspective view of another embodiment of the improved in-line skate of the present invention.

In another embodiment, as in FIG. 5, an in-line roller skate 210 includes a molded frame 212 and the molded boot 14. The molded boot 14 includes the molded shell 16 and the cuff 18 previously described with reference to the embodiment of FIG. 1. The molded frame 212 also includes the molded wheel frame 12 of the embodiment of FIG. 1 and additionally includes a molded brake frame 215. The brake frame 215 and the wheel frame 12 are integrally molded, referring to FIG. 6, such that a pair of frame walls 220 of the brake frame 215 are extensions of the upper frame wall portions 46 of the embodiment of FIG. 1. The outside surfaces 49 of the upper frame wall portions 46 and outside surfaces 221 of the frame walls 220, respectively, join to make a substantially smooth, unbroken surface. In one embodiment of the skate 210, the thickness of the upper frame wall portions 46 gradually increases from about 0.240 inches at the front end 28 of the shell 16 to about 0.30 inches toward the rear end 32 of the shell 16. Also, the frame walls 220 of the brake frame 215 are approximately 0.120 inches thick.

The brake frame 215 further includes a cover plate 292, referring back to FIG. 5, which is integral with and extends between upper edges 290 of the walls 220. The cover plate 292 is integrally molded in combination with the cover plate 94 of the embodiment of FIG. 1 as a smooth continuous plate. The fillets 53 (not shown in FIG. 5) are included where inside surfaces (not shown) of the frame walls 220 meet the cover plate 292, except at points where other structures such as reinforcement ribbing exist. The brake frame 215 also includes a brake mechanism 222. The brake mechanism 222 includes a hollow cylindrical post 224 which is substantially vertically oriented with respect to the ground surface 21 and is integral with the cover plate 292. The cylindrical post 224 includes a longitudinal smooth bore 226.

Figure 6:
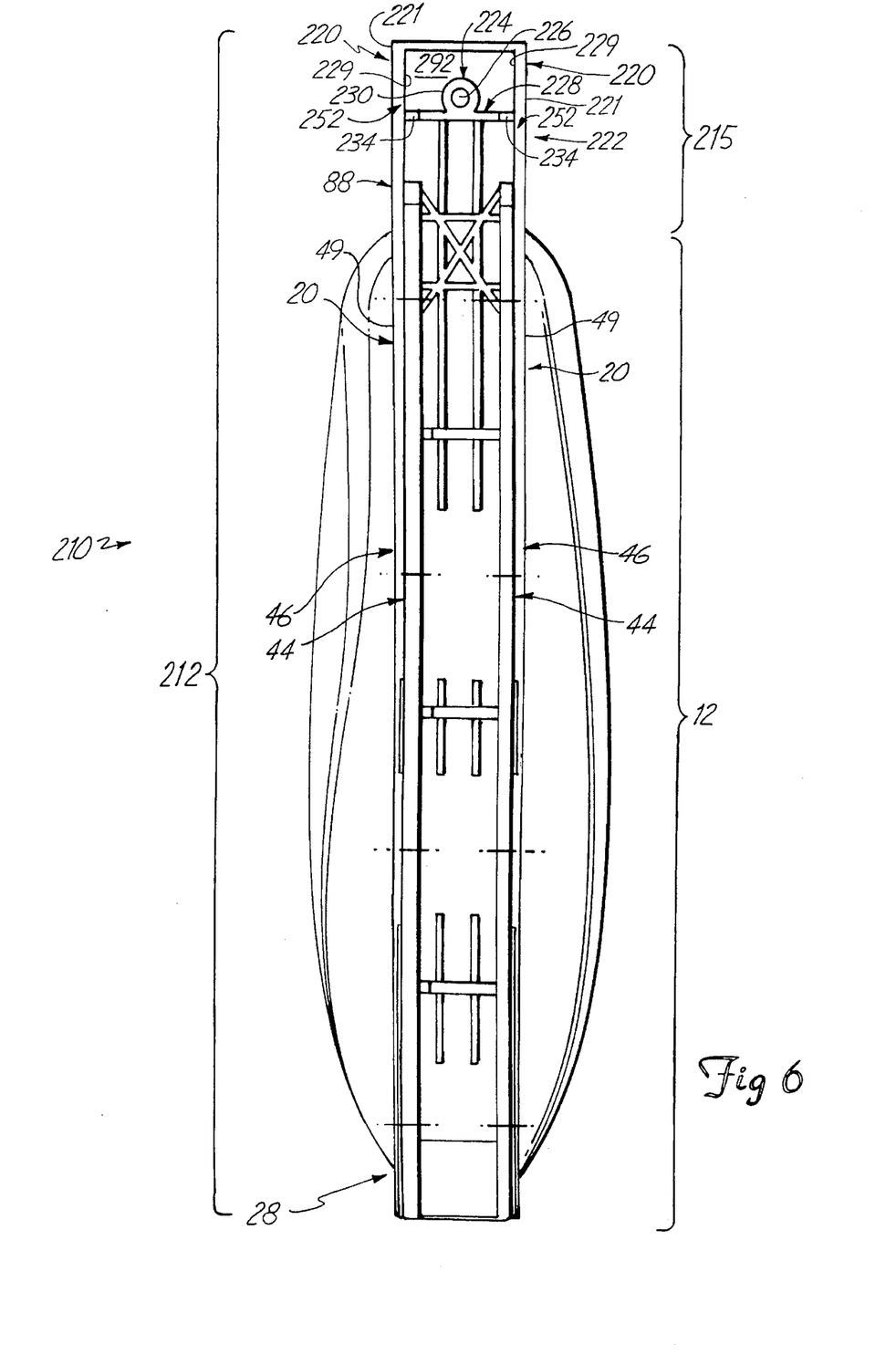
FIG. 6 is a bottom plan view of another embodiment of the improved in-line skate of the present invention with the wheels of the skate and the brake pad of the skate not shown for purposes of clarity.

Referring to FIG. 6, the brake mechanism 222 also includes a vertically-oriented brace plate 228 which is integral with and oriented substantially perpendicularly with respect to an inside surface 229 of the frame walls 220. The brace plate 228 is also integral with a peripheral surface 230 of the cylindrical post 224. The brace plate 228 and the cylindrical post 224 are substantially equidistant from the ground surface 21 (not shown in FIG. 6).

The brake mechanism 222 also includes a pair of tongues 234 which are integral with and aligned with the brace plate 228 and which are integral with the inside surface 229 of the frame walls 220. The tongues 224 extend downward from the brace plate 228 to within about 0.05 inches of a bottom edge 252 of the frame walls 220. In one embodiment, the tongues 234 extend away from the frame wall 220 a distance approximately equal to the thickness of one of the frame walls 220.

Referring back to FIG. 5, the brake mechanism 222 includes a brake pad 236 with grooves (not shown) which slidably engage the tongues 234 (not shown in FIG. 5) such that an upper surface (not shown) of the brake pad 236 comes into contact with the cylindrical post 224. The brake pad 236 includes a vertical bore (not shown) which is in alignment with the longitudinal smooth bore 226 of the post 224. A nut (not shown) is embedded within the brake pad 236 such that the nut (not shown) is in alignment and communication with the vertical bore (not shown) of the brake pad. A screw 244 extends through the bore 226 and the bore (not shown) of the brake pad and threadably engages the nut (not shown) such that the brake pad 236 is secured against the post 224 and the brace plate 228 (not shown in FIG. 5) and between the frame walls 220.

Figure 7:
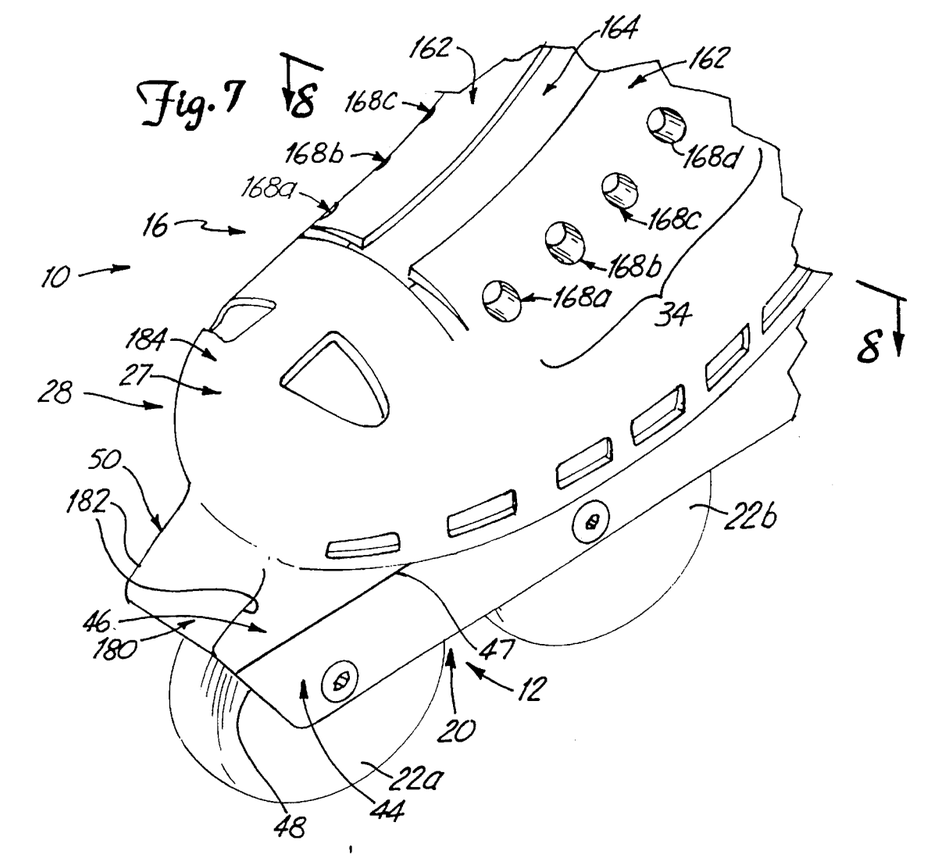
FIG. 7 is a partial perspective view of one embodiment of the improved in-line roller skate of the present invention.

Referring to FIG. 7, the fastening portion 34 of the shell 16 includes a pair of fastening flaps 162 which are separated from each other by a space 164. The space 164, which is substantially shaped like a rectangular strip with a shallow bow inward with respect to the shell 16, starts proximate the toe section 27 of the shell 16 and ends proximate a front side 165, best seen in FIG. 1, of the foot insertion aperture 36. Referring to FIG. 7, the width of the space 164 is variable along the length of the space 164 as the flaps 162 variably flex toward and away from each other when the skate is fastened and unfastened.

The mechanism 25 for securing tightened laces is located proximate the fastening flaps 162 of the fastening section 34 and includes a plurality of pairs of lacing apertures 168a–g. One aperture of each pair of apertures 168a–g is located in one of the fastening flaps 162 and the other aperture of each respective pair of lacing apertures 168a–g is located in the other fastening flap 162. As best illustrated in FIG. 8, the lacing apertures 168a–g are substantially cylindrical in shape and extend through the shell 16 at an angle to inner and outer surfaces 170, 172 of the shell 16.

Focusing on one aperture of the pair of lacing apertures 168c for purposes of illustration, the axial length of the lacing aperture 168c, taken along a central longitudinal axis 174 extending between the inner surface 170 and the outer surface 172, exceeds the thickness of the shell 16 taken along a line 175 oriented perpendicular to the inner and outer surfaces 170, 172, proximate the aperture 168c. An acute angle 176 exists where the outer surface 172 of the shell 16 and an upper inner surface 178 of the aperture 168c meet. The acute angle 176 and the lacing aperture 168c interact to substantially resist slippage of tightened laces (not shown). The acute angles (not shown) of the apertures 168a–168g which correspond to the acute angle 176 of the aperture 168c range from approximately forty-five degrees (45°) to eighty degrees (80°). The size of the acute angles (not shown) generally increases between the aperture 168a and the aperture 168g.

The diameter of a cross-section of the lacing apertures 168a–168g, taken normal to the interior surfaces of the apertures 168a–168g, is approximately 0.25 inches. The length of the lacing apertures 168a–g, measured in the manner described for the lacing aperture 168c, along axes similar to the axis 174 ranges from approximately 0.11 inches to approximately 0.2 inches. The thickness of the shell 16 proximate the apertures 168a–g and measured as described with respect to the thickness of the shell 16 proximate the aperture 168c ranges from approximately 0.09 inches to approximately 0.105 inches. In one embodiment, the length of the apertures 168a–g generally decreases between the aperture 168a and the aperture 168g. The apertures 168a–g are roughly equidistant from the space 164, with the distances between the space 164 and the apertures 168a–g ranging from approximately 0.5 inches to approximately 0.7 inches.

Referring back to FIG. 7, upper edges 182 of the upper frame wall portions 46 are integral with the shell 16 to within about 0.25 inches of a most forward point 184 of the shell 16. The most forward point 184 is substantially equidistant from each of the frame walls 20 and is located above the frame walls 20. Additionally, the toe section 27 of the shell 16 is rounded and curves uniformly rearward when moving from the most forward point 184 outward toward the upper frame wall portions 46 such that the shell 16 overhangs, but is not connected to, the upper frame wall portions 46 approximately 0.125 inches. Additionally, the upper frame wall portions 46 extend approximately 0.65 inches forward of the front of the shell 16. The frame 12 also includes a cover plate 180. The cover plate 180 extends between and is integral with the upper edges 182 of the upper frame wall portion 46 where the upper edges 182 are not integral with the shell 16. The fillets 53 (not shown in FIG. 7) are included where the inside surfaces 48 of the frame walls 20 meet the cover plate 180. The cover plate 180 is also integral with the toe section 27 of the shell 16 at the front end 28 of the shell 16.

Figure 9:
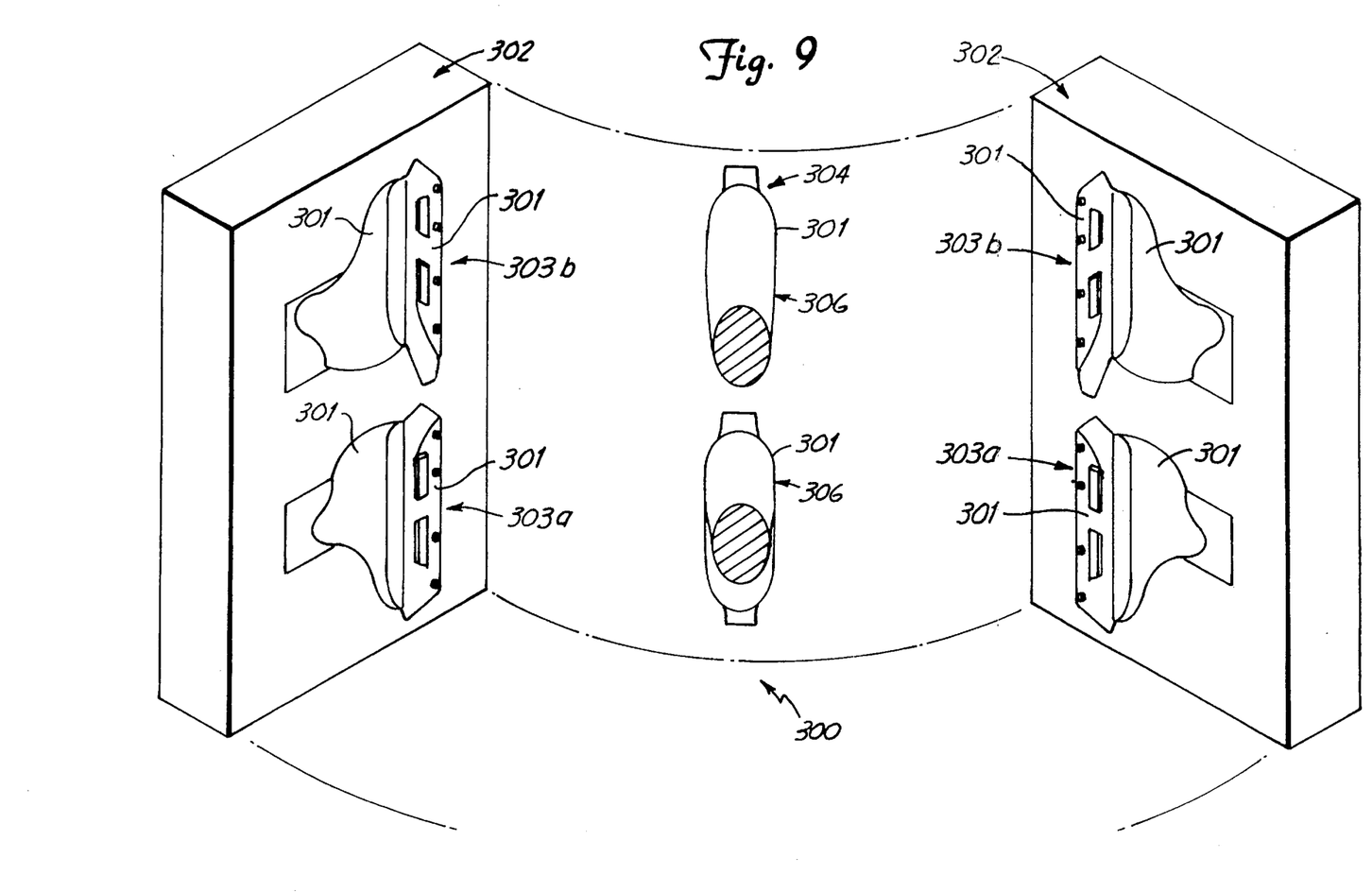
FIG. 9 is a perspective view of a fixture for molding boot portions of in-line skates of the present invention.

Referring to FIG. 9, the method of molding an in-line skate 10 that is substantially free of the effects of differential shrinkage includes the step of providing a mold 300. The mold 300 includes a plurality of surfaces 301 defining mold cavities (not shown) for forming the molded shell 16 and the molded wheel frame 12 of the skate 10 of FIG. 1 and for forming the molded shell 16 and the molded frame 212 of the skate 210 of FIG. 5. In addition, the method includes the steps of sealing the mold 300, injecting a polymeric resin into the cavities (not shown) of the mold 300, and removing the molded shell 16 and frame 12 of the skate 10 and the molded shell 16 and the frame 21 of the skate 210 from the mold 300.

The mold 300, as in FIG. 9, includes a pair of outer mold halves 302 and an inner core 304 for shaping the inside of the molded boots. The outer mold halves 302 each include two separate core portions 303*a*, 303*b* for forming an outer shell surface (not shown) of the boot 10 of FIG. 1 and an outer shell surface (not shown) of the boot 210 of FIG. 5. The inner core 304 includes a pair of core portions 306 for forming inner shell surfaces (not shown) of the boot 10 of FIG. 1 and the boot 210 of FIG. 5. The method further includes moving the outer mold halves 302 into engagement such that the inner core 304 is mateably engaged between the outer mold halves 302. In this orientation, the pair of core portions 303*a* match one of the core portions 306 to form a first cavity (not shown) defining the features of the shell 16 and frame 12 of the skate 10 of FIG. 1, and the pair of core portions 303*b* match the other of the core portions 306 to form a second cavity (not shown) defining the features of the shell 16 and frame 212 of the skate 210 of FIG. 5. In one embodiment, the skate 10 of FIG. 1 is shaped for a person's left foot (not shown) and the skate 210 of FIG. 5 is shaped for a person's right foot (not shown).

After the mold halves 302 are closed and secured to engage the core 304, polymeric resin is injected inside the first and second cavities (not shown) of the mold 300. Upon completion of the injection molding process, the molded skates 10 and 210, with integrally molded frames 12 and 212, respectively, as in FIGS. 1 and 5, respectively, are removed from the mold 300. The pairs of in-line wheels 22*a*–22*d* are then rotatably mounted to the respective frames 12, 212 in conventional fashion as illustrated in FIGS. 1 and 5, respectively.

Figure 10:
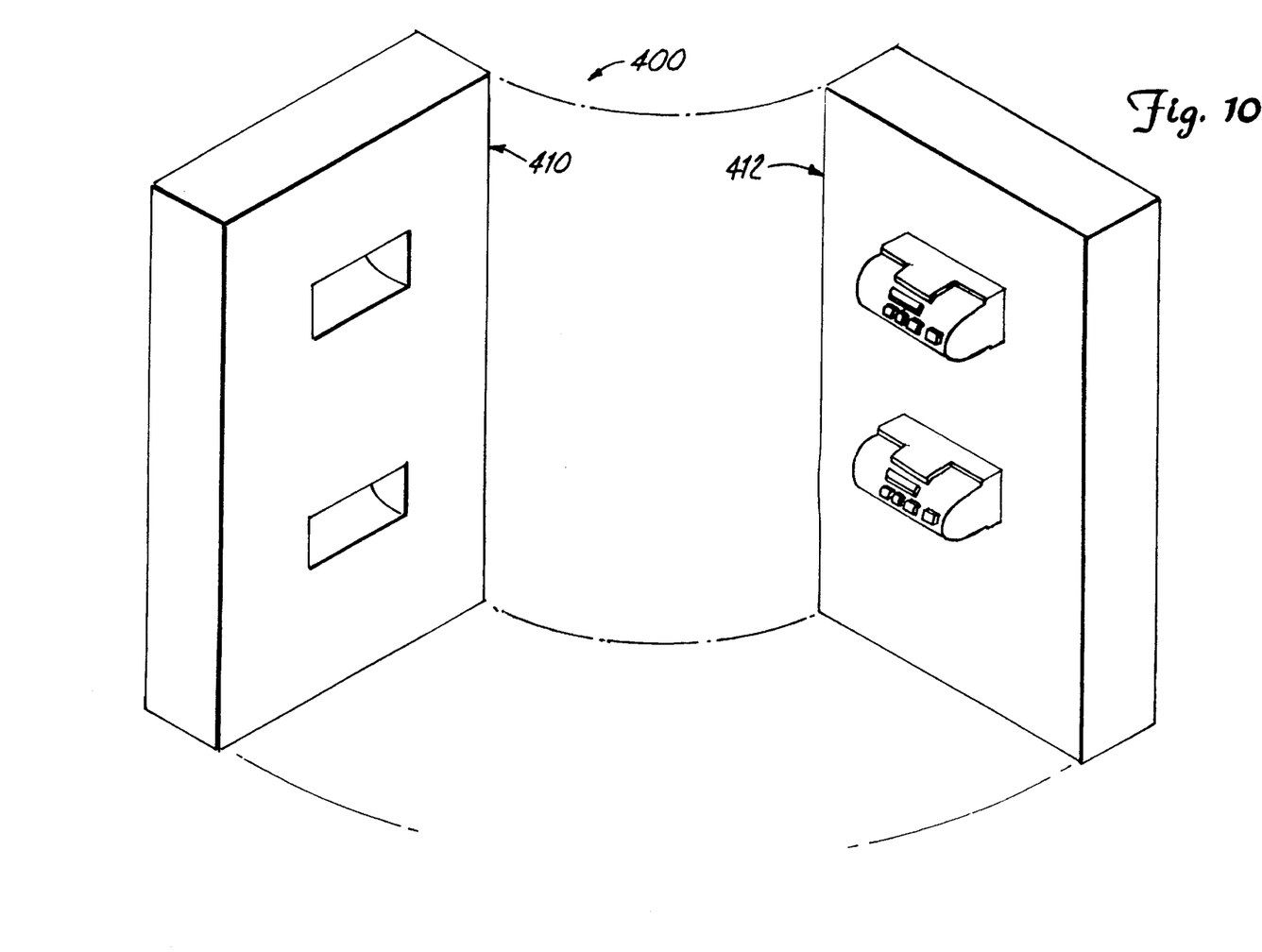
FIG. 10 is a perspective view of a fixture for molding cuff portions of in-line skates of the present invention.

In another embodiment of the molding method, a mold 400, illustrated in FIG. 10, includes a pair of mold halves 410, 412 for forming the cuff 18 of the skate 10 of FIG. 1 and the cuff 18 of the skate 210 of FIG. 5. After the two halves 410, 412 are engaged and secured, polymeric resin is injected into the cavities (not shown) of the mold 400. Upon completion of the injection molding process, the cuffs 18 are removed and are attached pivotally to the skates 10, 210, respectively, as illustrated in FIGS. 1 and 5, respectively. In another embodiment of the method, the outer mold halves 302 include channels (not shown) for forming the ridges 136 of the skates 10, 210, as illustrated in FIGS. 1 and 5, respectively. In yet another embodiment of the method, the outer mold halves 302 include a plurality of opposing core pins (not shown) for forming the lacing apertures 168*a*–168*g* of FIG. 1.

Although the present invention has been described with reference to preferred embodiments, workers skilled in the art will recognize that changes may be made in form and detail without departing from the spirit and scope of the invention.

What is claimed is:

1. A method of molding an in-line roller skate that is substantially free of the effects of differential shrinkage, the method comprising the steps of:

providing a mold for an in-line roller skate, the mold comprising first surfaces defining a first cavity for forming a molded boot with a sole, the first cavity including upper and lower surfaces for forming a first sole portion with a first thickness and second and third sole portions, each with a second thickness, the second thickness differing from the first thickness, and the mold also comprising second surfaces defining a second cavity for forming a molded frame integral with the molded boot;

injecting molding resin into the mold to form the in-line roller skate; and removing the in-line roller skate from the mold.

2. The method of claim 1 wherein the second thickness exceeds the first thickness.

3. The method of claim 1 wherein the molded frame includes first and second frame walls, the first frame wall integral with the second sole portion and the second frame wall integral with the third sole portion.

4. The method of claim 1 wherein the first sole portion is located between the second and third sole portions.

5. The method of claim 3 wherein the skate comprises molded reinforcement ribbing integral with the first and second frame walls.

6. The method of claim 5 wherein the molded reinforcement ribbing is integral with the sole.

7. A method of molding an in-line roller skate that is substantially free of the effects of differential shrinkage, the method comprising the steps of:

providing a mold for an in-line roller skate, the mold comprising first surfaces defining a first cavity for forming a molded boot with a sole and the mold comprising second surfaces defining a second cavity for forming a molded frame integral with the molded boot, the second cavity including lower surfaces for forming a first frame wall and a second frame wall of the molded frame, the second cavity also including ribbing surfaces associated with the lower surfaces for forming reinforcement ribbing integral with the first and second frame walls;

injecting molding resin into the mold to form the in-line roller skate; and removing the in-line roller skate from the mold.

8. The method of claim 7 wherein the molded boot includes first, second and third sole portions, the first sole portion having a first thickness and the second and third sole portions each having a second thickness, and with the second thickness differing from the first thickness.

9. The method of claim 8 wherein the first frame wall is integral with the second sole portion and the second frame wall is integral with the third sole portion.

10. The method of claim 8 wherein the first sole portion is located between the second and third sole portions.

11. The method of claim 7 wherein the molded reinforcement ribbing is integral with the sole.

12. A mold for making an in-line roller skate that is substantially free of the effects of differential shrinkage, the mold comprising:

a first plurality of surfaces defining a first cavity for forming a molded boot with a sole, the first cavity including interior and exterior surfaces for forming a first sole portion with a first thickness and second and third sole portions, each with a second thickness, the second thickness differing from the first thickness, and a second plurality of surfaces defining a second cavity for forming a molded frame integral with the molded boot.

13. The method of claim 12 wherein the second thickness exceeds the first thickness.

14. The mold of claim 12 wherein the molded frame includes first and second frame walls, the first frame wall integral with the second sole portion and the second frame wall integral with the third sole portion.

15. The mold of claim 12 wherein the first sole portion is located between the second and third sole portions.

16. The mold of claim 14 wherein the skate comprises molded reinforcement ribbing integral with the first and second frame walls.

17. The mold of claim 12 wherein the skate comprises molded reinforcement ribbing integral with the sole.

18. A mold for making an in-line roller skate that is substantially free of the effects of differential shrinkage, the mold comprising:

a first plurality of surfaces defining a first cavity for forming a molded boot with a sole and a second plurality of surfaces defining a second cavity for forming a molded frame integral with the molded boot, the second cavity including lower surfaces for forming a first and a second frame wall of the molded frame, the second cavity also including surfaces associated with the lower surfaces for forming reinforcement ribbing, the reinforcement ribbing integral with the first and second frame walls.

19. The mold of claim 18 wherein the molded boot includes first, second and third sole portions, with the first sole portion having a first thickness and the second and third sole portions each having a second thickness, with the second thickness differing from the first thickness.

20. The mold of claim 19 wherein the first frame wall is integral with the second sole portion and the second frame wall is integral with the third sole portion.

21. The mold of claim 19 wherein the first sole portion is located between the second and third sole portions.

22. The mold of claim 18 wherein the molded reinforcement ribbing is integral with the sole.

* * * * *